(12) United States Patent
Garritsen

(10) Patent No.: US 6,847,385 B1
(45) Date of Patent: Jan. 25, 2005

(54) METHOD AND APPARATUS FOR HARDWARE ROTATION

(75) Inventor: Frido Garritsen, Hayward, CA (US)

(73) Assignee: Silicon Motion, Inc., San Jose, CA (US)

( * ) Notice: Subject to any disclaimer, the term of this patent is extended or adjusted under 35 U.S.C. 154(b) by 236 days.

(21) Appl. No.: 10/177,874

(22) Filed: Jun. 20, 2002

Related U.S. Application Data

(60) Provisional application No. 60/385,003, filed on Jun. 1, 2002.

(51) Int. Cl.[7] ................................................. G09G 5/00
(52) U.S. Cl. ...................... 345/672; 345/545; 345/566; 345/568; 345/653; 345/654
(58) Field of Search ................................. 345/545, 566, 345/568, 569, 653, 654, 664, 665, 672

(56) References Cited

U.S. PATENT DOCUMENTS

| | | | |
|---|---|---|---|
| 5,367,634 A | 11/1994 | Nakamura | |
| 5,533,185 A | 7/1996 | Lentz et al. | |
| 5,564,117 A | 10/1996 | Lentz et al. | |
| 5,719,592 A | 2/1998 | Misawa | |
| 5,734,875 A | 3/1998 | Cheng | |
| 5,864,347 A | 1/1999 | Inoue | |
| 5,909,219 A | * 6/1999 | Dye | ............................ 345/582 |
| 5,956,049 A | 9/1999 | Cheng | |
| 5,960,165 A | 9/1999 | Kakuno et al. | |
| 5,966,116 A | 10/1999 | Wakeland | |
| 6,167,498 A | * 12/2000 | Larson et al. | ................ 711/202 |
| 6,226,016 B1 | 5/2001 | Chee et al. | |
| 6,628,294 B1 | * 9/2003 | Sadowsky et al. | ........... 345/568 |
| 6,690,427 B2 | * 2/2004 | Swan | ........................... 348/448 |

* cited by examiner

Primary Examiner—Matthew C. Bella
Assistant Examiner—Mackly Monestime
(74) Attorney, Agent, or Firm—Blakely, Sokoloff, Taylor & Zafman LLP

(57) ABSTRACT

A method and apparatus for hardware rotation is described. In one embodiment, the invention is an apparatus. The apparatus includes a direct access address translation component. The apparatus also includes a frame buffer coupled to the direct access address translation component. The apparatus further includes a 2D coordinate translation component. The apparatus also includes a 2D engine coupled to the 2D coordinate translation component and to the frame buffer. The apparatus further includes a 3D engine. The apparatus also include a 3D coordinate translation component coupled to the 3D engine and the frame buffer. As will be appreciated, further embodiments of the invention are within the spirit and scope of the claimed invention, and the specific details of a specific embodiment as described need not be present in all embodiments of the invention.

11 Claims, 9 Drawing Sheets

FIG. 9A

FIG. 9B

METHOD AND APPARATUS FOR HARDWARE ROTATION

CLAIM OF PRIORITY

This application claims priority to a prior-filed U.S. Provisional Patent Application having a Ser. No. of 60/385,003, entitled "METHOD AND APPARATUS FOR HARDWARE ROTATION" and a filing date of Jun. 1, 2002.

BACKGROUND OF THE INVENTION

1. Field of the Invention

The invention generally relates to the field of graphics within a computer, and more specifically to graphics subsystem design for use with a computer system.

2. Description of the Related Art

Graphics and video are important components in systems, such as computer systems and handheld systems. Typical displays in such systems have a landscape orientation (width longer than length). However, typical systems internally use a portrait orientation (length longer than width) for purposes of internal representation of the display system.

Traditionally, this has resulted in translation of addresses used to access the graphics and/or video subsystems by the processor and software. This requires use of scarce system resources to adjust the internal display representation of one part of the system (the processor and operating system) to work with the display representation used by the graphics and video subsystems.

Furthermore, 3D graphics already requires some address or coordinate translation within the graphics subsystem, as 3D graphics and 3D engines use a coordinate system which is different from that used by the rest of the graphics and video subsystems.

What may be valuable is a method and apparatus which can alleviate the burden on the processor and operating system of the system without interfering with legacy software which assumes the internal portrait orientation of display representation.

SUMMARY OF THE INVENTION

A method and apparatus for hardware rotation is described. In one embodiment, the invention is an apparatus. The apparatus includes a direct access address translation component. The apparatus also includes a frame buffer coupled to the direct access address translation component. The apparatus further includes a 2D coordinate translation component. The apparatus also includes a 2D engine coupled to the 2D coordinate translation component and to the frame buffer. The apparatus further includes a 3D engine. The apparatus also include a 3D coordinate translation component coupled to the 3D engine and the frame buffer.

In an alternate embodiment, the invention is a method of handling a direct graphics transaction. The method includes receiving a transaction request having a first set of coordinates. The method also includes translating the first set of coordinates of the request to a second set of coordinates. The method further includes reacting to the transaction.

In another alternate embodiment, the invention is a method of handling a 2D graphics transaction. The method includes receiving a request for a transaction. The method further includes translating a first set of coordinates associated with the request into a second set of coordinates. The method also includes performing a 2D operation of the request based on the second set of coordinates.

In yet another alternate embodiment, the invention is a method of handling a 3D graphics transaction. The method includes receiving a transaction request. The method also includes performing a 3D operation corresponding to the transaction request. The method further includes translating a first set of coordinates of the transaction request into a second set of coordinates after performing the 3D operation. The method also includes interfacing with a frame buffer using the second set of coordinates.

As will be appreciated, further embodiments of the invention are within the spirit and scope of the claimed invention, and the specific details of a specific embodiment as described need not be present in all embodiments of the invention.

BRIEF DESCRIPTION OF THE DRAWINGS

The present invention is illustrated by way of example and not limitation in the accompanying figures. The embodiments illustrated include various details which need not be present in all embodiments of the invention.

FIG. 9A illustrates a mapping between portrait and landscape modes in one embodiment.

FIG. 9B illustrates a mapping between portrait and landscape modes with a separate region in one embodiment.

DETAILED DESCRIPTION

Figure 1:
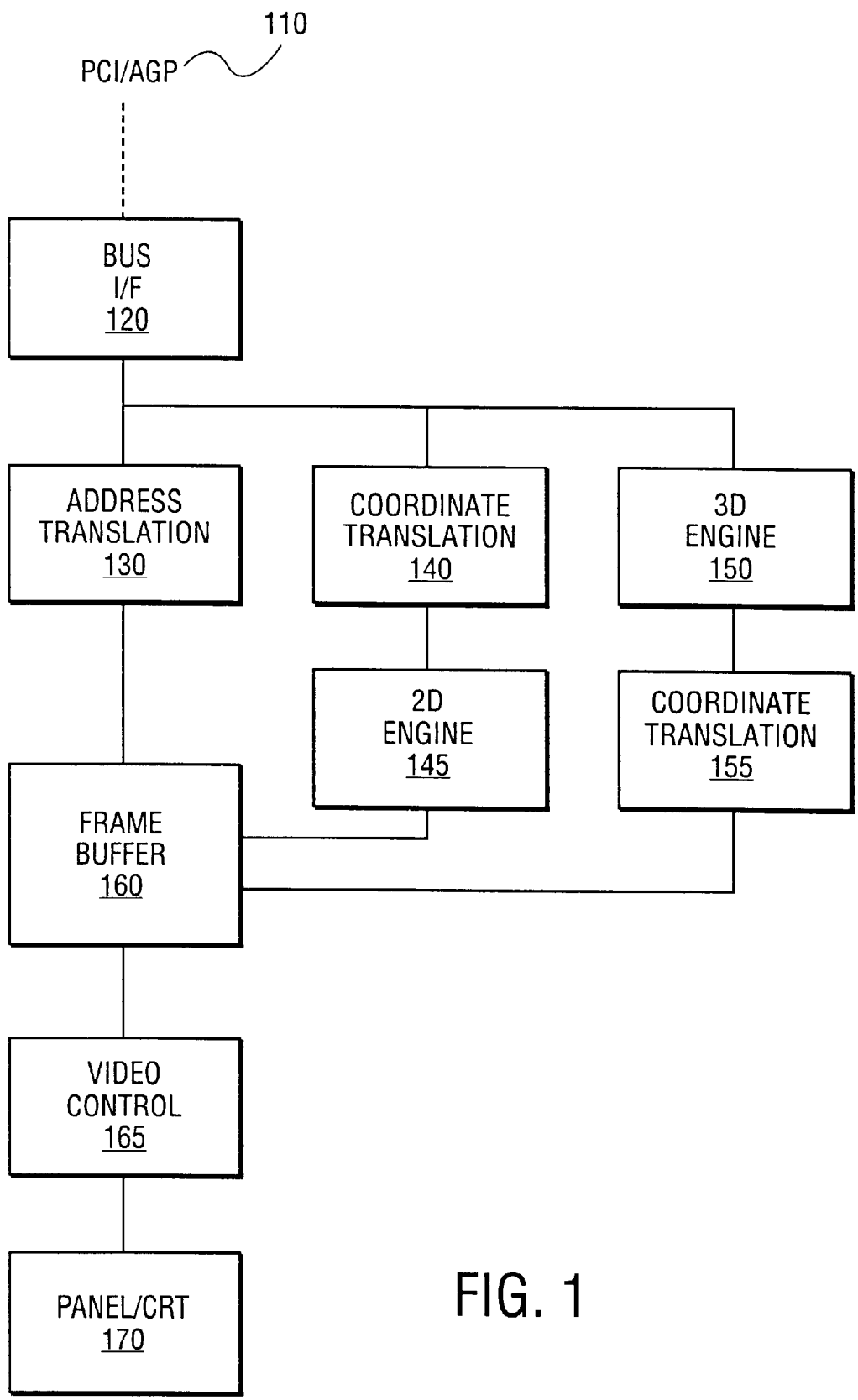
FIG. 1 illustrates an embodiment of a graphics subsystem.

A method and apparatus for hardware rotation is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Reference in the specification may be made to components coupled to or connected to each other. When a component is coupled to another component, it will be appreciated that intervening components may be present, through which a chain of connections of various forms may be used to achieve the coupling in question. When a component is connected to another component, it will be appreciated that typically the two components are connected directly to each other, with the possible exception of well-known intervening components which one having skill in the art would expect to find.

Transactions with a graphics subsystem may typically be divided into three categories. Transactions may be direct AGP (or similar direct protocol) transactions (requiring no use of a rendering engine), 2D transactions, or 3D transactions. Each presents its own set of problems and each must be handled properly. A direct AGP transaction is a request to either write to or read from the frame buffer directly. A 2D transaction is a request to write or read data which must be manipulated by the 2D engine (such as through rotation or reflection). A 3D transaction is a request to read or write data which must be manipulated by the 3D engine, such as by projection, texturing, or other forms of rendering.

In a typical system, such as a desktop, handheld or tablet system, the processor addresses the contents of the frame buffer in portrait mode (long height, shorter width), while the actual frame buffer is designed to handle graphics in landscape mode (long width, shorter height). Should the system be shifted to display in landscape mode, this distinction may disappear, but systems typically default to portrait mode for display, even though monitors (CRT or LCD) typically have landscape format. Thus, the need for address translation.

A method and apparatus for hardware rotation is described. In one embodiment, the invention is an apparatus. The apparatus includes a direct access address translation component. The apparatus also includes a frame buffer coupled to the direct access address translation component. The apparatus further includes a 2D coordinate translation component. The apparatus also includes a 2D engine coupled to the 2D coordinate translation component and to the frame buffer. The apparatus further includes a 3D engine. The apparatus also include a 3D coordinate translation component coupled to the 3D engine and the frame buffer.

In an alternate embodiment, the invention is a method of handling a direct graphics transaction. The method includes receiving a transaction request having a first set of coordinates. The method also includes translating the first set of coordinates of the request to a second set of coordinates. The method further includes reacting to the transaction.

In another alternate embodiment, the invention is a method of handling a 2D graphics transaction. The method includes receiving a request for a transaction. The method further includes translating a first set of coordinates associated with the request into a second set of coordinates. The method also includes performing a 2D operation of the request based on the second set of coordinates.

In yet another alternate embodiment, the invention is a method of handling a 3D graphics transaction. The method includes receiving a transaction request. The method also includes performing a 3D operation corresponding to the transaction request. The method further includes translating a first set of coordinates of the transaction request into a second set of coordinates after performing the 3D operation. The method also includes interfacing with a frame buffer using the second set of coordinates.

FIG. 1 illustrates an embodiment of a graphics subsystem. Coupled to the subsystem is PCI/AGP bus 110 (this may be one or the other type of bus, or any other type of processor bus, as appropriate). Bus interface 120 is coupled to bus 110.

Address translation component 130 is coupled to bus interface 120, and is used to translate addresses from a system context to a frame buffer context for direct AGP transactions, so address translation component 130 may be used as a direct access address translation component. Address translation component 130 is coupled to frame buffer 160, where the requested data is stored. Thus, when a request is received by address translation component 130, the component 130 determines whether the address is provided in landscape or portrait format, and then either leaves the address untranslated (landscape) or translates the address (portrait) before providing the address to the frame buffer. Data is also provided to the frame buffer or read from the frame buffer in conjunction with the address from address translation component 130.

Coordinate translation component 140 is coupled to bus interface 125 and also to 2D engine 145. Coordinate translation component 140 operates in a similar manner to address translation component 130, in that it operates by either translating or not translating a coordinate based on a portrait or landscape mode of a system. However, the transactions upon which coordinate translation component 140 operates are related to 2D engine 145. 2D engine 145 operates on coordinates which are in the same x-y space as those coordinates operated on by the frame buffer, and those coordinates may be simply translated from coordinates used by the system. By translating coordinates before providing data from the system to the 2D engine, this allows the 2D engine to operate simply and efficiently on data within the frame buffer, without requiring any translations.

Typically, the 2D engine uses coordinates related to addresses by the following equation in one embodiment.

$$DEST = BASE + x*BPP + y*PITCH$$

DEST is the destination address. BASE is the base address for the region or window. BPP is bytes per pixel, and PITCH is bytes per line. By changing coordinates and direction of a block transfer (bit), a surface can be rotated. For example:

Portrait: FILL (10,20) to (40,50)

transforms to:

Landscape: FILL (640−20,10) to (640−50,40)

Where BPP=2, PITCH=1280, and the frame buffer for the screen is 640×480×16 bits.

Address translation component 155 is coupled to the frame buffer 160 and to the 3D engine 150. 3D engine 150 is also coupled to the bus interface 120, allowing for essentially direct access (without translations) between the 3D engine and the system. As the 3D engine operates on a different coordinate system than that of the frame buffer 160, some form of translations almost invariably occur when exchanging data between the 3D engine 150 and the frame buffer 160. The 3D engine, for example, operates on coordinates with floating point values, and the address translation component 155 then translates those coordinates into integer values for use with the frame buffer 160.

The final stage in the 3D engine pipeline of some embodiments is a stage which converts floating point coordinates into frame buffer x-y coordinates. Typically, this may be done in some embodiments using a separate z-plane for z-components of a coordinate for depth purposes. This is referred to as rasterization. By adding coordinate translation at this point of the pipeline, we easily change between portrait and landscape with no significant penalty in hardware.

With the data in the frame buffer 160, the monitor (panel/CRT 170) may be controlled. Video controller 165 is coupled to the frame buffer 160 and to the monitor 170.

Video controller 165 draws data from the frame buffer 160, and provides that data (potentially in substantially altered form) to monitor 170. For this reason, it is valuable to have the frame buffer designed with essentially the same logical size and shape (in terms of data organization) as the monitor 170, so that the video controller 165 need only be capable of transforming system representations of video signals into video representations of video signals, rather than also requiring translation of addresses at the video controller stage. In particular, as translation would be necessary for 3D rendering regardless, adding address translation for 2D graphics (either direct access or through the 2D engine) is potentially less of a burden than including address translation in the video controller 165.

As will be appreciated, each of address or coordinate translation components 130, 140 and 155 may be programmable and flexible. For example, each may allow for windowing (setting distinct translation rules for regions or portions of a display). Furthermore, each may potentially allow for translation from various different orientations, such that a coordinates may be translated to effect a 90 degree rotation, a 180 degree rotation, or a 270 degree rotation as necessary.

Moreover, translation in different memory spaces may proceed according to separate rules. For example, a memory space with video memory may have 32 BPP (bit per pixel) pixels, while a frame buffer may have 16 BPP pixels. Memory with 32 BPP should be translated in 4-byte chunks, whereas memory with 16 BPP should be translated in 2-byte chunks. Using registers as part of address or coordinate translation allows for simple tracking of such variations and hardware may thus be programmed or configured to treat translations differently based on potential sources or destinations of the data.

Figure 2:
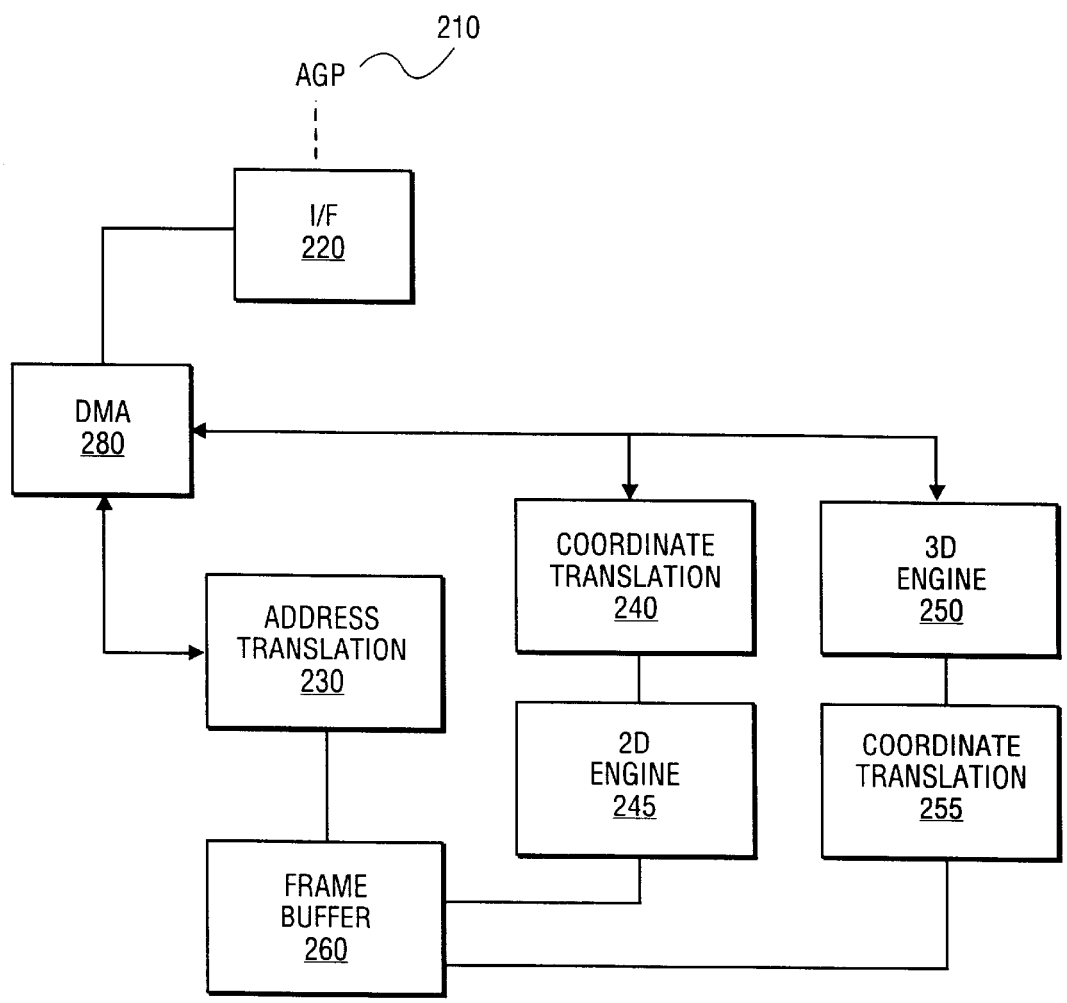
FIG. 2 illustrates an alternate embodiment of a graphics subsystem.

FIG. 2 illustrates an alternate embodiment of a graphics subsystem. Interface 220 is suitable for coupling to an AGP bus such as AGP bus 210. Coupled to interface 220 is DMA control 280. DMA control 280 controls interface 220 and routes data to and from interface 220. DMA control is also coupled to 3D engine 250, coordinate translation unit 240 and address translation unit 230. DMA control 280 also controls 3D engine 250, coordinate translation unit 240 and address translation unit 230. Address translation unit 230 is coupled to frame buffer 260, and handles transactions sent directly from the AGP bus 210 to the frame buffer 260. Coordinate translation unit 240 handles transactions directed to 2D engine 245, which is coupled to both coordinate translation unit 240 and frame buffer 260. 3D engine 250 handles transactions related to 3D graphics, and then passes on coordinates and data to coordinate translation unit 255, which in turn is coupled to frame buffer 260. DMA control 280 may, in some embodiments, directly control frame buffer 260, coordinate translation 255 and 2D engine 245, too.

DMA control 280 controls the frame buffer 260 through address translation 230, and also controls the interface 220, thereby regulating transactions between the various parts of the graphics subsystem and between the graphics subsystem and the external system. Coordinate translation unit 255, similarly to coordinate translation component 155, handles data and associated coordinates after the data is rendered by 3D rendering engine 250. Coordinate translation unit 240, similarly to coordinate translation component 140, handles coordinates and associated data bound for the 2D engine 245. Again, the common coordinate space used by the 2D engine 245 and the frame buffer 260 allows for this relationship. DMA control 280 operates in a fashion similar to other known DMA modules, taking into account the internal structure of the graphics subsystem and controlling access to memory therein.

Figure 3:
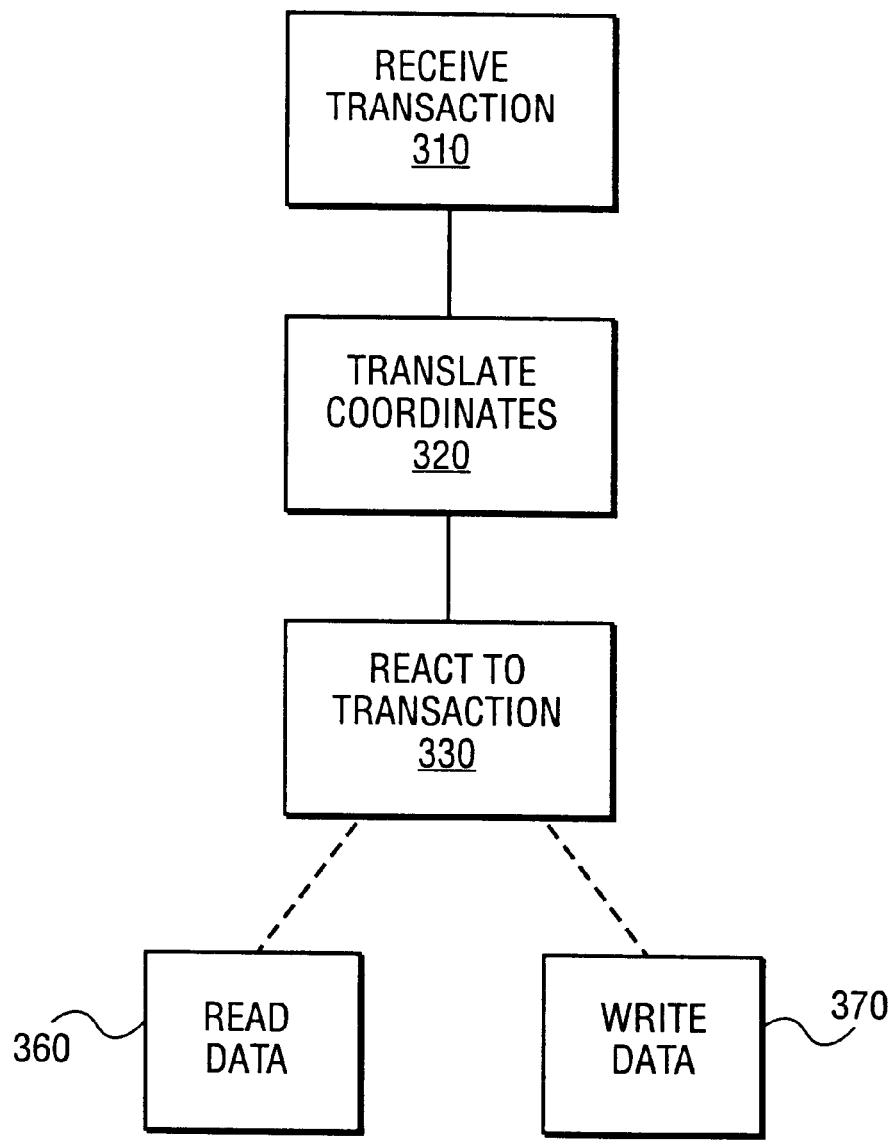
FIG. 3 illustrates an embodiment of a method of processing a graphics transaction.

FIG. 3 illustrates an embodiment of a method of processing a graphics transaction. This method is directed toward handling 2D graphics by directly addressing the frame buffer. At block 310, a transaction, such as a read or write request including an address or an address and data respectively, is received. At block 320, the address of the transaction is translated based on whether the sender of the request is using the same orientation mode (landscape) as the graphics subsystem or a different orientation mode (portrait) for that particular address. At block 330, the subsystem reacts to the transaction by handling it according to the nature of the request. If the request is a simple read, the process proceeds to block 360 and the data is read, such as from the frame buffer at the translated addresses. If the request is a write, the process proceeds to block 370, and associated data is written to the frame buffer at the translated coordinates.

Figure 4:
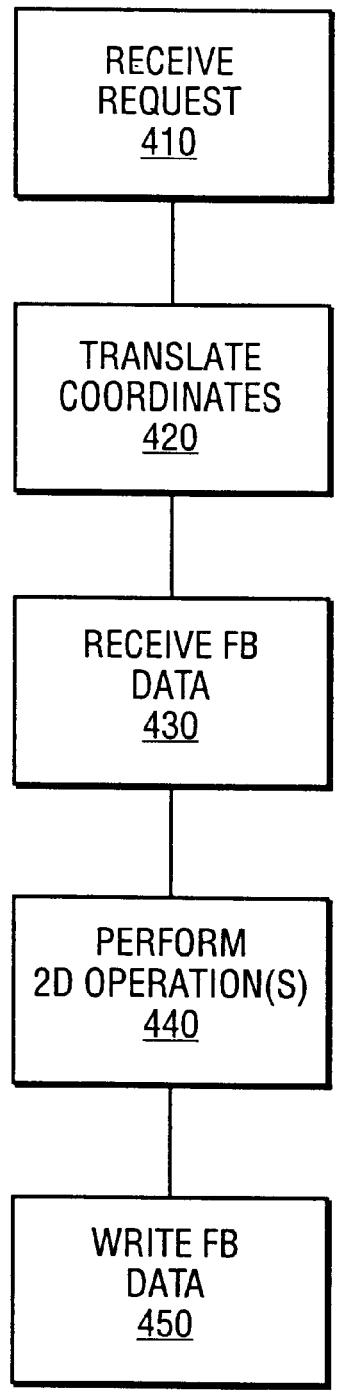
FIG. 4 illustrates an embodiment of a method of processing a 2D graphics transaction.

FIG. 4 illustrates an embodiment of a method of processing a 2D graphics transaction. Such a transaction includes a request for action by a 2D graphics engine on data already present in a frame buffer. At block 410, the request is received in the graphics subsystem. At block 420, the coordinates of the request are translated. Note that in this instance, the coordinates are an x-y pair, rather than a single address for the data, and may be utilized by the 2D engine to perform graphics operations.

At block 430, the frame buffer data is received from the frame buffer by the 2D engine. At block 440, the 2D operation is performed. At block 450, the frame buffer data as transformed by the 2D operation is written back to the frame buffer. As will be appreciated, this internal operation of the graphics subsystem does not require any translation of coordinates after the operation occurs, because the 2D engine and the frame buffer operate on the same coordinate system. However, the coordinates will be used to find an address within the frame buffer for the data in some embodiments, where the frame buffer is addressed using a single address rather than x-y coordinates.

Figure 5:
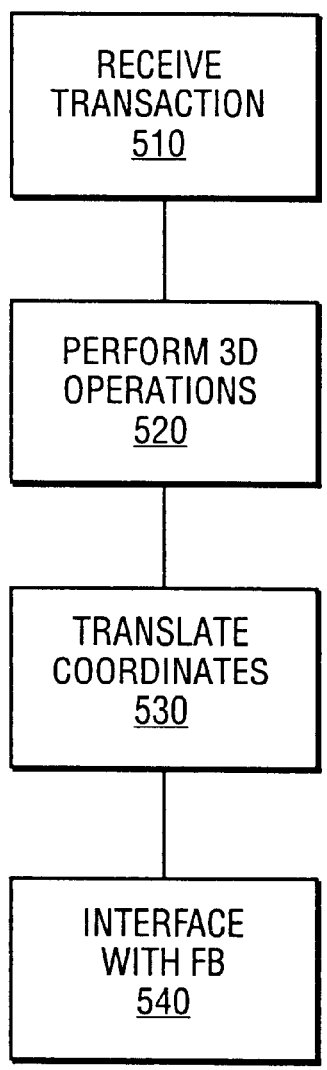
FIG. 5 illustrates an embodiment of a method of processing a 3D graphics transaction.

FIG. 5 illustrates an embodiment of a method of processing a 3D graphics transaction. At block 510, a transaction is received. At block 520, the 3D graphics engine performs the requested operation(s), such as rendering and/or texturing a triangle or tracing a ray for example. At block 530, the coordinates specified based on the 3D coordinate system are translated into appropriate addresses for the 2D coordinate system of the frame buffer. At block 540, the appropriate interface with the frame buffer (such as for a write operation or a read operation) is performed.

Figure 6:
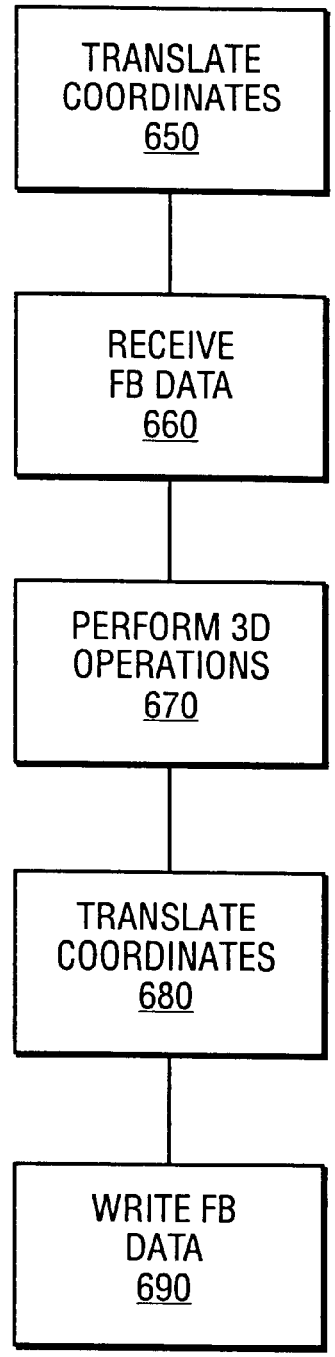
FIG. 6 illustrates an alternate embodiment of a method of processing a 3D graphics transaction.

FIG. 6 illustrates an alternate embodiment of a method of processing a 3D graphics transaction. At block 650, coordinates of the relevant data are translated such that they relate to the address system used by the frame buffer. At block 660, data from the frame buffer is received. At block 670, 3D operations are performed by the 3D engine on the data with associated coordinates (the untranslated coordinates are retained). At block 680, the coordinates as transformed by the 3D operations are translated back to the frame buffer coordinate/address system. At block 690, the frame buffer data (as transformed) is written back to the frame buffer.

Figure 7A:
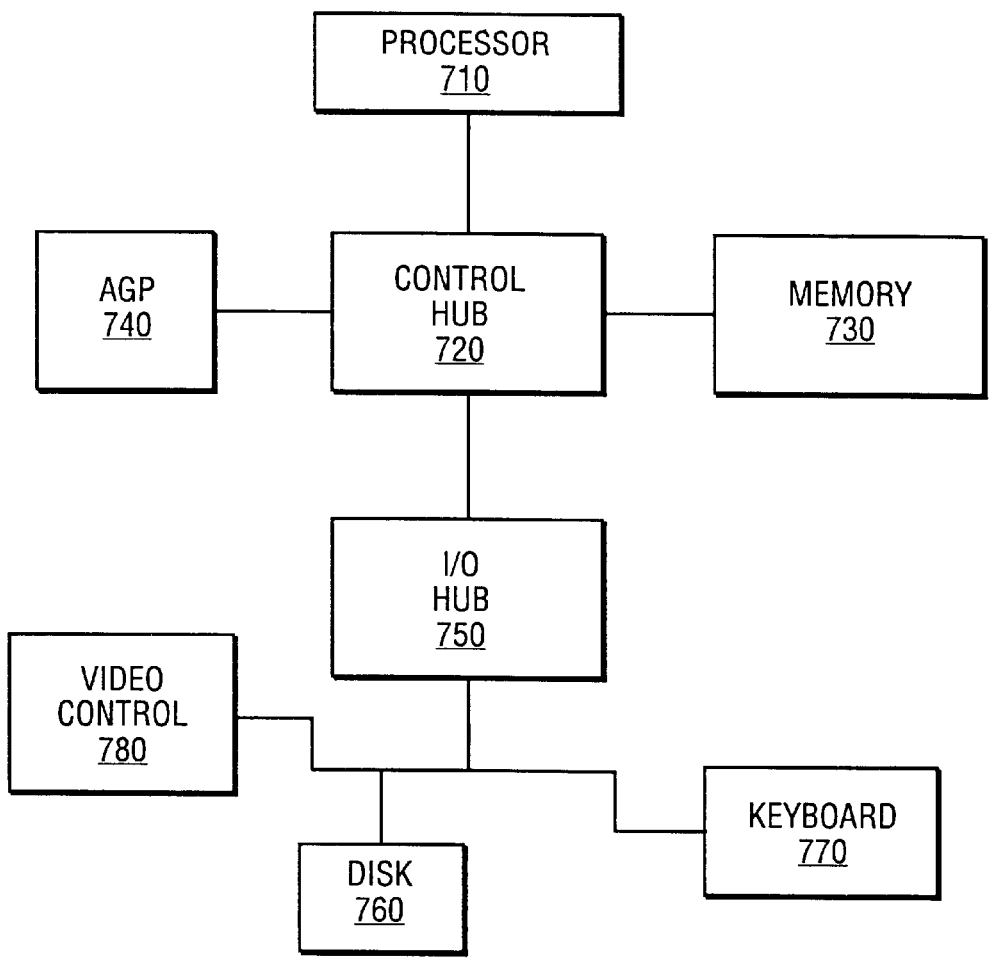
FIG. 7A illustrates an embodiment of a system.

FIG. 7A illustrates an embodiment of a system. Processor 710 is a processor suitable for executing instructions. Control hub 720 is coupled to processor 710 and acts as a gateway to processor 710. AGP subsystem 740 is coupled to control hub 720 and is an AGP port suitable for communication with a graphics subsystem. AGP subsystem 740 may alternatively be viewed as including the AGP port and the corresponding graphics subsystem. Memory 730 is also coupled to control hub 720, and may be used to store instructions or data as a machine-readable medium.

I/O hub 750 is also coupled to control hub 720 and is used to manage I/O transactions within the system. Video control 780 is coupled to I/O hub 750, and is used to manage the video output to a monitor of the system. Note that video control 780 may also be coupled directly to AGP 740. Disk 760 is coupled to I/O hub 750, and performs a mass storage function for the system, thereby embodying in a machine-readable medium instructions and data. Keyboard 770 is also coupled to I/O hub 750, and is used by the system for input from a user. It will be appreciated that other components may be substituted into the system, such as a FLASH storage card for disk 760, a pen input system for keyboard 770, and other substitutions which will be appreciated by one skilled in the art.

Figure 7B:
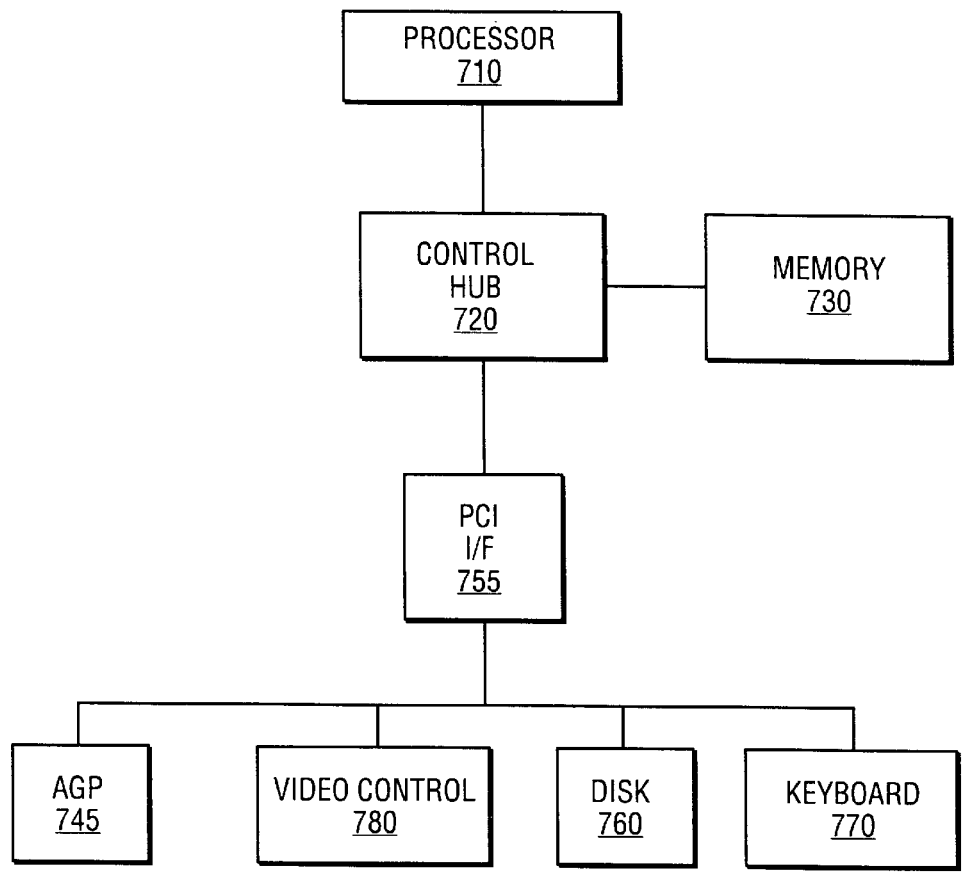
FIG. 7B illustrates an embodiment of a system.

FIG. 7B illustrates an embodiment of a system. Processor 710 is a processor suitable for executing instructions. Control hub 720 is coupled to processor 710 and acts as a gateway to processor 710. Memory 730 is also coupled to control hub 720, and may be used to store (or embody) instructions or data as a machine-readable medium.

PCI interface 755 is also coupled to control hub 720 and is used to manage I/O transactions within the system. AGP subsystem 745 is coupled to PCI interface 755 and is an AGP port suitable for communication with a graphics subsystem. AGP subsystem 745 may alternatively be viewed as including the AGP port and the corresponding graphics subsystem. Video control 780 is coupled to PCI interface 755, and is used to manage the video output to a monitor of the system. Note that video control 780 may also be coupled directly to AGP 740, or may utilize the connection available through the PCI bus controlled by PCI interface 755. Disk 760 is coupled to PCI interface 755, and performs a mass storage function for the system, thereby embodying in a machine-readable medium instructions and data. Keyboard 770 is also coupled to PCI interface 755, and is used by the system for input from a user. It will be appreciated that other components may be substituted into the system, such as a FLASH storage card for disk 760, a pen input system for keyboard 770, and other substitutions which will be appreciated by one skilled in the art.

Figure 8:
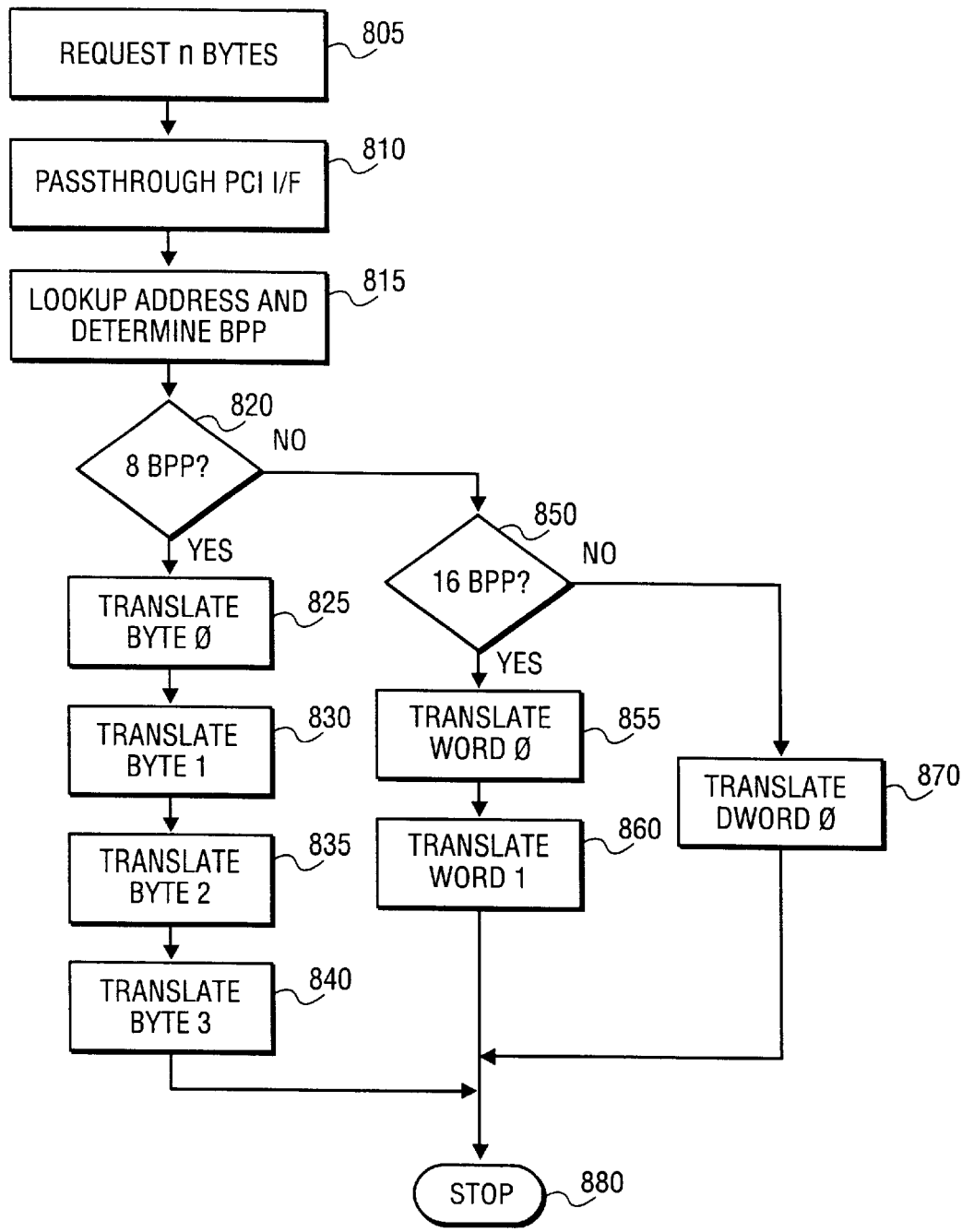
FIG. 8 illustrates an embodiment of a state machine suitable for reading a set of four bytes.

FIG. 8 illustrates an embodiment of a state machine suitable for reading a set of four bytes. At block 805, a quantity of bytes are requested as part of a transaction. At block 810, the request is passed through the PCI (or other bus) interface. At block 815, the address in question is looked up, to determine the number of bytes per pixel (BPP) associated with that address. At block 820, a determination is made as to whether the address uses 8 BPP. If so, at block 825, the first byte (byte 0) is translated to the appropriate address. Next, at block 830, the second byte (byte 1) is translated to the appropriate address. Next, at block 835, the third byte (byte 2) is translated to the appropriate address. Next, at block 840, the fourth byte (byte 3) is translated to the appropriate address.

If, at block 820, the address is determined to not have 8 BPP, a determination is made at block 850 as to whether the address uses 16 BPP. If so, at block 855, the first word (word 0) is translated to the appropriate address, and at block 860, the second word (word 1) is translated to the appropriate address. If not, at block 870, the double word (Dword 0) is translated to the appropriate address. At the culmination of any of blocks 840, 860, or 870, the process proceeds to block 880 and terminates.

As will be appreciated, the process or state machine in question is necessitated because operations normally occur using double-words of data, but some schemes may use a single byte (8 BPP) or word (16 BPP) to represent a pixel. Furthermore, as will be appreciated, the state machine or flow diagram depicts a generally linear process, whereas the process may be implemented in various parallel or partially parallel fashions, such as by translating all four bytes essentially simultaneously for an 8 BPP region, or by performing all seven illustrated translations essentially simultaneously and selecting the preferred translation(s).

Figures 9A, 9B:
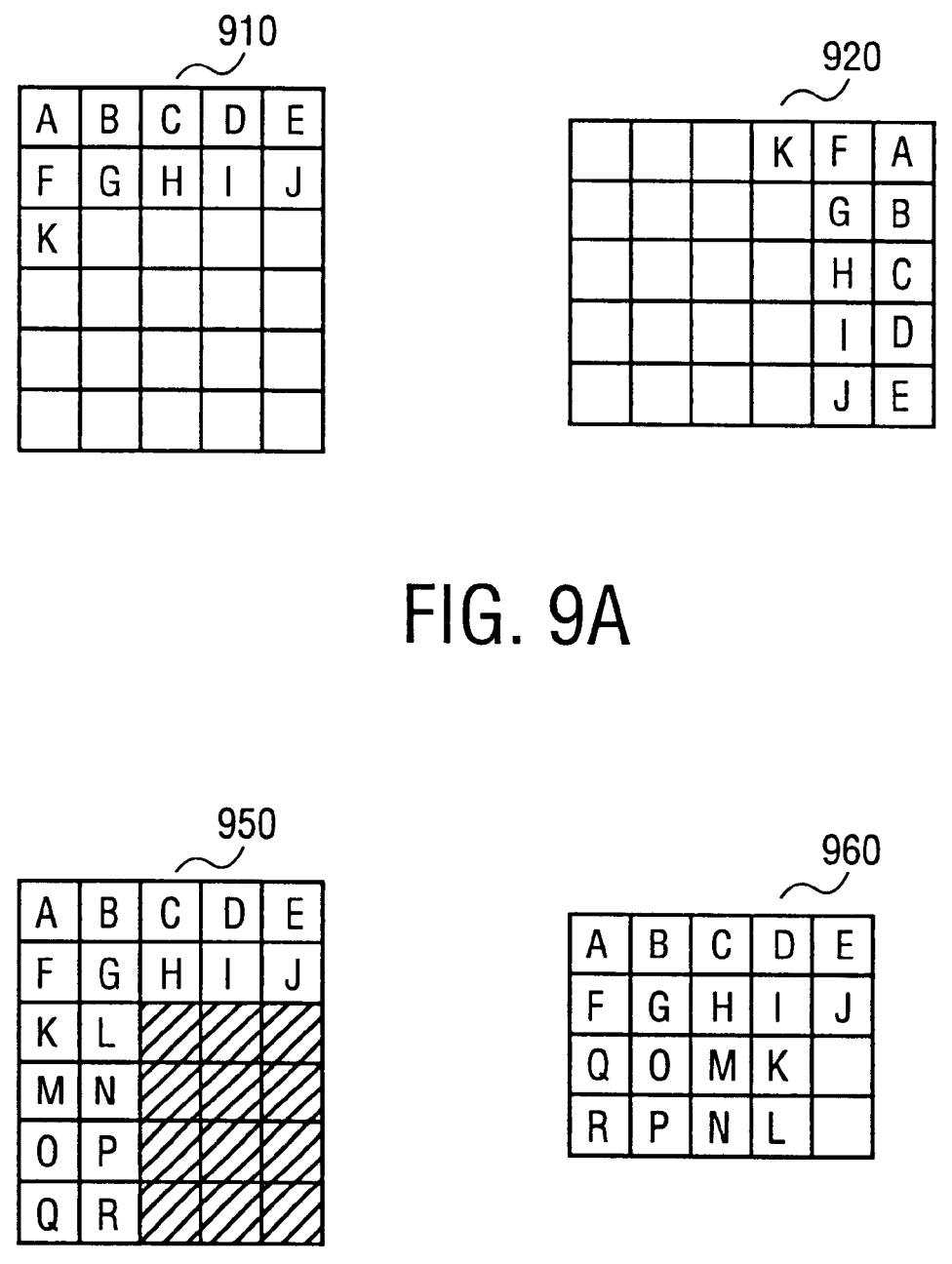

FIG. 9A illustrates a mapping between portrait and landscape modes in one embodiment. Buffer 910 is in portrait mode, with values A, B, C, D, E, F, G, H, I, J, and K stored therein. Buffer 920 is in landscape mode, with the same values A, B, C, D, E, F, G, H, I, J, and K stored therein. To access the appropriate storage locations in the buffer 920, based on addresses for the buffer 910, a translation is thus required. Such a translation is similar to the translations performed by the address and coordinate translation components and units discussed above.

FIG. 9B illustrates a mapping between portrait and landscape modes including a region in one embodiment. Buffer 950 in portrait mode includes a first region which includes a 2×4 subsection of the buffer and a second region which includes a 5×2 subsection of the buffer. As illustrated, the first region is in landscape mode. Buffer 960 illustrates the storage of the same values in landscape mode, with the first region of buffer 960 illustrating storage of the values corresponding to the first region of buffer 950. As will be appreciated, values A, B, C, D, E, F, G, H, I, J, K, L, M, N, O, P, Q, and R are stored in each of buffers 950 and 960. Furthermore, values K, L, M, N, O, P, Q, and R are stored in the first regions buffers 950 and 960. With a programmable translation module, such a region system may easily be implemented, such as by supplying a set of coordinates bounding the region and specifying landscape mode for that region.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1 or 7 may be integrated into components, or may be subdivided into components. Similarly, the blocks of FIG. 6 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. An apparatus comprising:
   a direct access address translation component to translate a first set of coordinates into a second set of coordinates;
   a frame buffer coupled to the direct access address translation component;
   a 2D coordinate translation component to translate the first set of coordinates into the second set of coordinates;

a 2D engine coupled to the 2D coordinate translation component and to the frame buffer;

a 3D engine; and a 3D coordinate translation component coupled to the 3D engine and the frame buffer, the 3D coordinate translation component to translate the first set of coordinates into the second set of coordinates.

2. The apparatus of claim 1 further comprising:

a bus interface coupled to the direct access address translation component, the 2D coordinate translation component, and to the 3D coordinate translation component, the bus interface suitable for coupling to a bus of a system.

3. The apparatus of claim 2 further comprising:

a video controller coupled to the frame buffer, the video controller suitable for coupling to a display.

4. The apparatus of claim 3 further comprising:

a display coupled to the video controller.

5. The apparatus of claim 1, wherein the first set of coordinates is in a format of a system and the second set of coordinates is in a format of a frame buffer.

6. The apparatus of claim 5, wherein the direct access address translation component translates the first set of coordinates into the second set of the coordinates if the first set of coordinates is in a portrait format and the second set of coordinates is in a landscape format and the direct access address translation component provides the data to the frame buffer without translation if the first set of coordinates is in the landscape format.

7. A system comprising:

a processor;

a bus coupled to the processor;

a memory coupled to the bus;

a graphics controller coupled to the bus, the graphics controller including:

a bus interface coupled to the bus;

a direct access address translation component coupled to the bus interface to translate a first set of coordinates into a second set of coordinates;

a frame buffer coupled to the direct access address translation component;

a 2D coordinate translation component coupled to the bus interface to translate the first set of coordinates into the second set of coordinates;

a 2D engine coupled to the 2D coordinate translation component and to the frame buffer;

a 3D engine coupled to the bus interface; and a 3D coordinate translation component coupled to the 3D engine and the frame buffer, the 3D coordinate translation component the first set of coordinates into the second set of coordinates.

8. The system of claim 7 further comprising:

a video controller coupled to the frame buffer.

9. The system of claims 8 further comprising:

a display coupled to the video controller.

10. A system comprising:

a processor;

a control hub coupled to the processor;

a bus coupled to the control hub;

an AGP port coupled to the bus;

a graphics controller coupled to the AGP port, the graphics controller including:

a bus interface coupled to the AGP port;

a direct access address translation component coupled to the bus interface to translate a first set of coordinates into a second set of coordinates;

a frame buffer coupled to the direct access address translation component;

a 2D coordinate translation component coupled to the bus interface to translate the first set of coordinates into the second set of coordinates; a 2D engine coupled to the 2D coordinate translation component and to the frame buffer;

a 3D engine coupled to the bus interface; and a 3D coordinate translation component coupled to the 3D engine and the frame buffer, the 3D coordinate translation component to translate the first set of coordinates into the second set of coordinates.

11. The system of claim 10 further comprising:

a video controller to the frame buffer; and a display coupled to the video controller.

* * * * *